United States Patent [19]

Ohashi

[11] 4,437,728

[45] Mar. 20, 1984

[54] PHOTO-SWITCH

[75] Inventor: Shigeo Ohashi, Tokyo, Japan

[73] Assignee: Nihon Kaiheiki Kogyo Kabushiki Kaisha, Tokyo, Japan

[21] Appl. No.: 305,761

[22] Filed: Sep. 25, 1981

[30] Foreign Application Priority Data

Sep. 30, 1980 [JP] Japan .................. 55-140408[U]

[51] Int. Cl.³ .............................................. G02B 7/26
[52] U.S. Cl. ................................. 350/96.20; 350/96.18
[58] Field of Search ............. 350/96.15, 96.18, 96.20, 350/269

[56] References Cited

U.S. PATENT DOCUMENTS

| 4,124,271 | 11/1978 | Green | 350/96.20 |
| 4,170,731 | 10/1979 | Howell et al. | 350/96.20 X |
| 4,261,638 | 4/1981 | Wagner | 350/96.15 |

FOREIGN PATENT DOCUMENTS 2820433 11/1978 Fed. Rep. of Germany ... 350/96.20

55-95903 7/1980 Japan ......................... 350/96.20

Primary Examiner—John D. Lee
Attorney, Agent, or Firm—Lawrence I. Field

[57] ABSTRACT

A photo-switch having a switch case, a plurality of photo-transmissive bodies inserted into the switch case with their ends arranged in a side-by-side relation, and an intermediate photo-transmissive body or a reflecting member carried by a switching means. The switching means is operable to move the ends of the intermediate photo-transmissive body or the reflecting member into and out of optical connection with the ends of the plurality of photo-transmissive bodies thereby to selectively interrupt the transmission of light between the photo-transmissive bodies. When the intermediate photo-transmissive body or the reflecting member is moved away from the ends of the photo-transmissive bodies, a light shielding member is brought into the gap therebetween to improve the resolution of the photo-switching operation.

9 Claims, 14 Drawing Figures (a)  (b)

PHOTO-SWITCH

BACKGROUND OF THE INVENTION

The present invention relates to a switch and, more particularly, to a photo-switch adapted to open and close the path of photo-transmission making use of photo-transmissive bodies such as optic fibers.

Such a photo-switch has been known as having, for example, a first photo-transmissive body such as an optic fiber, a light-emitting diode provided at one end of the first photo-transmissive body to act as a light source, a second photo-transmissive body such as an optic fiber, a photo-diode as a light-receiving element and a switch circuit using a relay or the like provided at one end of the second photo-transmissive body, a switch case remote from the light source and the switch circuit and connected to the other ends of the first and second photo-transmissive bodies, and a light shielding member disposed in the switch case and adapted to selectively interrupt the transmission of light from the first photo-transmissive body to the second photo-transmissive body so as to turn on and off the light-receiving element such as a photo-diode, thereby to actuate the switch circuit by means of the output signal from the photo-diode.

This type of photo-switch is disclosed, for example, in Japanese Utility Model Laid-open No. 42259/1980.

As will be seen from FIG. 1, this known photo-switch has a tube 4 interconnecting the ends of the first and second photo-transmissive bodies 2 and 3 opposed to each other in the switch case 1. The tube 4 is adapted to be collapsed and released by the end of a light-shielding plate 6 which is rocked by the operation of a handle to selectively interrupt the light. In this known structure, therefore, it is necessary to maintain as large a distance as possible between the two photo-transmissive bodies, in order to reduce the secular change of elasticity of the tube 4 due to repeated operation. The increased distance between the two photo-transmissive bodies causes a large loss of light when the light is transmitted from the first photo-transmissive member 2 to the second photo-transmissive member 3.

It is also to be pointed out that, since the tube 4 is pressed at the same portion thereof for a number of times, the deterioration of the tube 4 is heavy to cause malfunctions.

Another known photo-switch is shown in Japanese Utility Model Laid-open No. 50550/1980. In this known photo-switch, as shown in FIG. 2, a reflecting member 8 is mounted on a movable member 7 adapted to rotate in a seesaw-like manner in the switch case 1, so as to selectively reflect the incoming light from the first photo-transmissive body 2 to selectively transmit the light to the second photo-transmissive body 3.

In this known photo-switch shown in FIG. 2, the rotary member 7 rotates along an arcuate path at a position adjacent to the ends of the first and second photo-transmissive bodies which are introduced and arranged in the switch case 1 in parallel with each other. It is, therefore, necessary to provide a required distance between the photo-transmissive bodies 2,3 and the reflecting member 8. This in turn inevitably causes a loss of light (large attenuation of light) when the switch is in the on state. In addition, due to the reflection across a predetermined space, the light from the first photo-transmissive body 2 is inevitably scattered to the region other than the second photo-transmissive body 3.

It is also to be pointed out that, since no light shielding plate is provided, there is a slight leak of light from the first photo-transmissive body 2 to the second photo-transmissive body 3 in the off state of the switch. This leak of light may cause an erroneous operation of the switch.

Another problem of the photo-switch shown in FIG. 2 is that the reflecting efficiency of the reflecting member may be drastically lowered due to dewing and clouding of the reflecting surface due to a change in the ambient temperature. The dew on the reflecting surface causes a random reflection. In order to avoid the clouding of the reflecting surface, it has been proposed to apply silicon or the like to the surface of the reflecting member. This countermeasure, however, cannot prevent condensing of dew onto the lower part of the reflecting surface.

Thus, there are many problems in the prior art.

SUMMARY OF THE INVENTION

Accordingly, a major object of the invention is to provide a novel photo-switch which can remarkably reduce the loss of light in the transmission of light from one to the other photo-transmissive body and which has a high mechanical strength to ensure a reliable operation, thereby to overcome the above-described problems of the prior art.

To this end, according to the invention, there is provided a photo-switch comprising: a switch case, first and second photo-transmissive bodies having ends introduced into the switch case in parallel with each other, and a third photo-transmissive body or a reflecting member bent to have both ends extended in parallel with the ends of the first and second photo-transmissive bodies, the third photo-transmissive body or the reflecting member being adapted to be actuated by a handle so that both its ends may be selectively brought to oppose or to contact with the parallel ends of the first and second photo-transmissive bodies, thereby to open and close the path of light.

In this photo-switch of the invention, when the switch takes the "on" state, the end surfaces of the third photo-transmissive body or the reflecting member are positioned in close proximity to the ends of the first and second photo-transmissive bodies while, in the "off" state of the switch, the ends of the first and second photo-transmissive bodies are completely shielded from each other by a shielding member, so that the loss of light transmission is remarkably reduced to ensure a large resolution of the "on" and "off" states of the switch.

In addition, since the photo-switch of the invention does not incorporate the tube which is used in the conventional switches, it can have a high mechanical stability to perform a highly reliable switching operation.

DESCRIPTION OF THE PREFERRED EMBODIMENTS

Preferred embodiments will be now be described with reference to the accompanying drawings.

Figure 1:
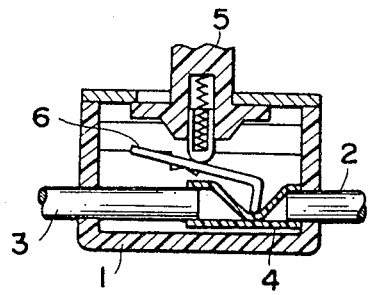
FIG. 1 is a sectional view of a part of a known photo-switch.
Figure 2:
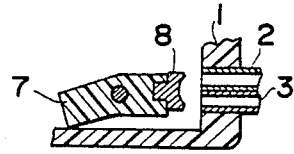
FIG. 2 is a sectional view of a part of another known photo-switch.
Figure 3:
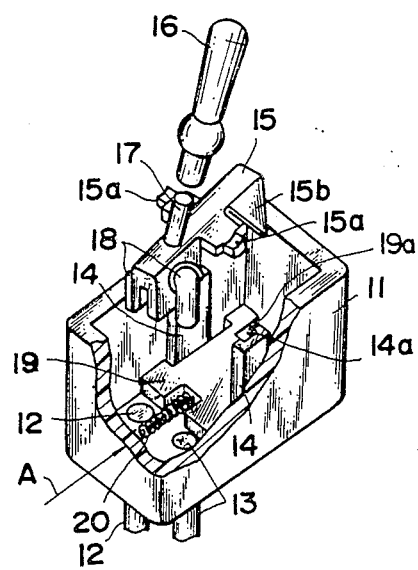
FIG. 3 is an exploded perspective view of an essential part of a photo-switch in accordance with a first embodiment of the invention.
Figure 4:
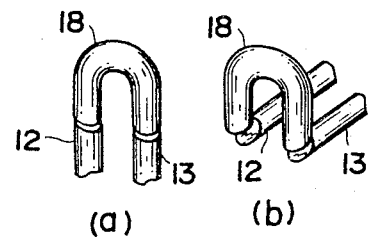
FIGS. 4a and 4b are perspective views showing how the ends of first and second photo-transmissive bodies are optically connected to the ends of a third photo-transmissive body.

Referring first to FIG. 3 which is an exploded perspective view of an essential portion of a first embodiment, a first photo-transmissive body 12 and a second photo-transmissive body 13 are introduced into a switch case 11 from the bottom of the latter in parallel with each other and are fixed to the switch case 11. Alternatively, as shown in FIG. 4b, the first and second photo-transmissive bodies 12,13 may be introduced into the switch case from lateral sides of the switch case. The first and second photo-transmissive bodies 12,13 are constituted by, for example, optic fibers. A light source consisting of a light-emitting diode, for example, is connected to the other end of one of two photo-transmissive bodies while a light-receiving element such as a photo-diode and a switch circuit including a relay or the like are connected to the other end of the other photo-transmissive body. A supporting member 14 having an upper fulcrum 14a is secured to the inner surfaces of walls of the switch case 11. A switching element 15 is rockably supported by the supporting member 14 with both its end lugs 15a engaged by the fulcrum 14a. The arrangement is such that, as a slider 17 movably carried by a handle 16 through a spring (not shown) is slid on the upper face of the switching element 15 to the left and right in accordance with the operation of the handle 16, the switching element 15 is rocked in a seesaw-like manner around the fulcrum 14a. To one end of the switching element 15, there is fixed a U or V-shaped third photo-transmissive body 18 having end surfaces facing both ends of the first and second photo-transmissive bodies 12,13, while a projection 15b having a tapered surface is formed on the other end of the switching element 15. The illustrated shape of the switching element 15 is not intended to be limiting. For instance, the switching element 15 can have a construction to cover the side surface of the third photo-transmissive body 3 or other shape. FIGS. 4a and 4b show examples of optical combination between the first to third photo-transmissive bodies. More specifically, in the arrangement shown in FIG. 4b, the opposing ends of these photo-transmissive bodies are tapered. On the ends of the first and second photo-transmissive bodies 12,13, a shielding member 19 is disposed to shield the light therebetween. The shielding member 19 is normally biased in the direction of an arrow A by means of a spring connected to one end thereof. The shielding member 19 is notched at its other end as at 19a. The arrangement is such that, as the projection 15b of the switching element 15 moves downward, the tapered surface of the projection 15b comes into engagement with the notch 19a of the shielding member 19 to press the latter, so that the shielding member 19 is moved in the direction opposite to the arrow A overcoming the force of the spring 20 to cover the end surfaces of the first and second photo-transmissive bodies 12,13 to provide a light shield therebetween. In the described embodiment, the projection 15b is provided with the tapered surface. This, however, is not exclusive and the tapered surface may be provided on the notch 19a. The spring 20 for biasing the shielding member is not essential. For instance, it is possible to arrange the device so that the shielding member is moved to the left and right by tilting action of the switching element by making use of the tapered surface.

The photo-switch of the first embodiment described heretofore operates in a manner explained hereinunder. As the handle 16 is tilted to the right, the left end of the switching element 15 is moved downward, so that the ends of the third photo-transmissive body 18 are brought into contact with the ends of the first and second photo-transmissive bodies 12,13 or to positions in close proximity of these ends. In consequence, the light is transmitted from the first to the second photo-transmissive bodies 12,13 through the third photo-transmissive body 18, so that this photo-switch is turned to the "on" state. Then, as the handle 16 is tilted to the left to cause a downward movement of the right end of the switching element 15, the tapered surface of the projection 15b presses the notch 19a so that the shielding member 19 is moved in the direction opposite to the arrow A overcoming the force of the spring 20. In consequence, the end surfaces of the first and second photo-transmissive bodies 12,13 are shielded from each other, so that the light transmission therebetween is interrupted to turn the switch into the "off" state.

Thus, the photo-switch of this embodiment is turned "on" and "off" by the operation of the handle 16. This operation makes and breaks the transmission of light between the light source and the light receiving element which are connected to the other ends of the first and second photo-transmissive bodies 12,13 and spaced by a large distance from the switch case 11. Thus, the transmission of light is controlled by the photo-switch to control the state of the light-receiving element which in turn actuates the switch circuit by means of a relay or a transistor. Needless to say, a laser beam source can be used as the light source.

As has been described, in the photo-switch of the first embodiment of the invention, the ends of the first and second photo-transmissive bodies 12,13 are brought into perfect contact with the associated ends of the third photo-transmissive body 18 or to face the ends of the latter with a gap which is so small as to make the attenuation of light negligibly small, when the switch takes the "on" state. Also, in the "off" state of this switch, the first and the second photo-transmissive bodies are optically disconnected from each other by the presence of the shielding member therebetween. In consequence, the transmission loss of light can be remarkably reduced and it is possible to obtain a large resolution between the "on" and "off" states.

This effect constitutes an advantageous feature of the invention.

It is also to be pointed out that, since the tube required in the conventional switches can be eliminated and no light reflecting member nor the rotary member for rotating the same is used, various disadvantages attributable to the use of these mechanical parts are completely obviated.

In the described embodiment of the invention, in addition, it is possible to arrange the first and second photo-transmissive bodies 12,13 at the same side of the switch case 11 thanks to the use of the U or V-shaped third photo-transmissive body 18. This permits an easy adaptation of the photo-switch to the wiring specification. For the same reason, it is possible to arrange the third photo-transmissive body 18 substantially at a right angle to the first and second ones 12,13, by providing a tapered surface at each end of the photo-transmissive body 18 as illustrated in FIG. 4b. This conveniently permits the introduction of the first and second photo-transmissive bodies 12,13 from any desired direction to cope with the demand in the specification, e.g. in the same direction as the third photo-transmissive body 18 as shown in FIG. 4a or at a right angle to the same as illustrated in FIG. 4b.

Figure 5:
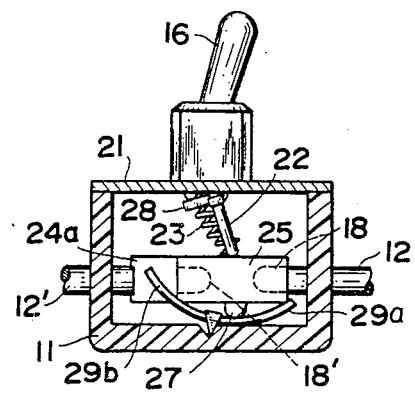
FIGS. 5 and 6 are a sectional view and an exploded perspective view of an essential part of a second embodiment of the invention.
Figure 6:
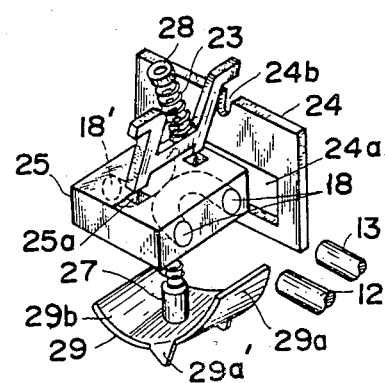

Referring now to FIGS. 5 and 6 which are a sectional view and an exploded perspective view of an essential part of a second embodiment, two pairs of the first and second photo-transmissive bodies 12,13 and 12',13' are introduced into and fixed to the switch case 11 from both lateral sides of the latter. A switching element 25 has a pair of third photo-transmissive bodies 18,18'. 18 is for the first pair of the first and the second phototransmissive bodies 12,13 while 18' is for the other pair 12',13'. Two recesses 25a formed in the top surface of the switching element 25 are engaged by legs of an actuator 22 having a shape as illustrated. The arrangement is such that the switching element 25 is moved, by means of the actuator 22 operatively connected to the handle 16, to the left and right along a guide hole 24a of a guide plate 24 provided on each side wall of the switch case 11. Each guide plate 24 is provided at its upper part with a notch 24b receiving each flange of the actuator 22, so that the actuator 22 can operate making use of these notches 24b as a fulcrum. A spring 23 is connected at its one end to the center of the actuator 22 and at its other end to the lower end of the handle 16 through a cap 28. A shielding member 29 having the illustrated shape is disposed beneath the switching element 25 and has two lugs (projections) 29' received by corresponding recesses formed in the bottom of the switch case. A slider 27 is provided at the lower part of the switching element 25 rotable back and forth through the medium of a spring. Thus, the shielding member 29 is rockable in a seesaw-like manner in accordance with the operation of the switching member 25, through the action of the slider 27.

In the operation of this second embodiment, as the handle 16 is tilted to the right, the switching element 25 is moved to the right through the action of the actuator 22 and the spring 23. In consequence, both end surfaces of the third photo-transmissive body 18 are brought opposite to the ends of the first and second photo-transmissive bodies 12,13 or into contact with the same, so that the photo-switch between the photo-transmissive bodies 12,13 is turned to the "on" state. In the meantime, the end surfaces of the third transmissive body 18' are spaced away from the ends of the first and second transmissive bodies 12',13' and the shielding portion 29b of the shielding member 29 is interposed therebetween, so that the switch between the photo-transmissive bodies 12',13' is turned completely into the "off" state. When the handle 16 is turned to the left, the switching element 25 also is moved to the left, so that the third photo-transmissive body 18' is moved to the conductive position to turn the switch "on" between the first and second photo-transmissive bodies 12',13', whereas the shielding portion 29a of the shielding member 29 is brought into the position between the third photo-transmissive body 18 and the associated first and second photo-transmissive bodies 12,13 to turn this switch "off".

The effect of this second embodiment is not described here because it is essentially identical to that of the first embodiment.

As a modification of this second embodiment, one of the combinations of the first to third photo-transmissive bodies may be eliminated. In such a case, the photo-switch has a single function to make and break a single path of light.

Figure 7:
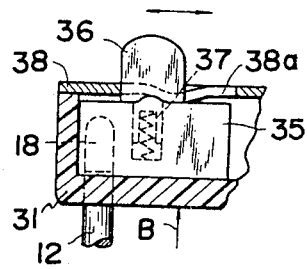
FIG. 7 is a sectional view of a part of a third embodiment.

FIG. 7 shows a section of an essential part of a third embodiment of the invention applied to a slide switch. In this embodiment, the first and second photo-transmissive bodies 12,13 are introduced into the switch case 31 through the bottom of the switch casing 31 at a right angle to the latter. The body 13 is hidden behind the body 12 and, hence, invisible. Thus, the first and second photo-transmissive bodies 12,13 are fixed to the switch case 31 with their ends directed upwardly. A switching element 35, adapted to be slid by the operation of a handle 36, carries a U or V-shaped third photo-transmissive body 18 with the ends of the latter directed downwardly. The handle 36 is adapted to be guided by a through hole formed in a cover 38 closing the switch case 31. The hole has an undulated or convex and concave longitudinal side 38a, so that a feel of click may be produced as a slider 37, which is movably attached to the switching element 35 through a spring, is moved along the undulated side of the hole. This clicking mechanism may be formed in the bottom of the switch case 31.

The operation of this third embodiment is as follows. In the state shown in FIG. 7, the photo-switch takes the "on" state, because the ends of the third photo-transmissive body 18 are held opposite to or in contact with the ends of the first and second photo-transmissive bodies 12,13. As the handle 36 is moved from this state to the right, the switching element 35 is also moved to the right, so that the ends of the third photo-transmissive body 18 are moved away from the ends of the first and second photo-transmissive bodies 12,13 to form a vacant space above the ends of the latter, so that the light is attenuated to create the "off" state of the switch. In this case, however, the resolution is not so high because the transmission of the light is not interrupted perfectly. To improve the resolution, it is possible to make use of the switching element 35 as the light shielding member. To this end, the first and second photo-transmissive bodies 12,13 are inserted into and fixed to the switch case 31 at a portion of the latter indicated by an arrow B. By so doing, in the illustrated state, the end surfaces of the photo-transmissive bodies 12,13 are perfectly shielded from each other, so that the photo-switch can take a perfect "off" state.

Then, as the switching element 35 is moved to the right, the ends of the third photo-transmissive body 18 are brought opposite to or into contact with the ends of the first and second photo-transmissive bodies 12,13 to turn the photo-switch into an "on" state. In this case, it is possible to obtain a resolution between "on" and "off" states as large as those in the first and second embodiments. The effect of this third embodiment is substantially identical to that offered by the preceding embodiments. In this embodiment, however, it is to be noted that the construction of the switch as a whole is very much simplified.

As a modification of the third embodiment, it is possible to dispose the third photo-transmissive body 18 at the center of the switching element 35. It is also possible to incorporate two or more pairs of the first and second photo-transmissive bodies.

Figure 8:
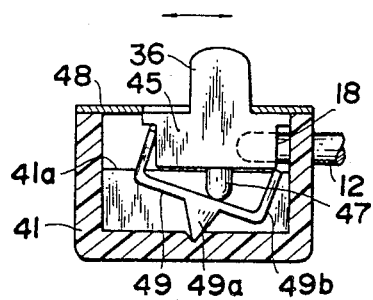
FIG. 8 is a sectional view of a fourth embodiment.

Referring now to FIG. 8 showing a fourth embodiment of the invention, first and second photo-transmissive bodies are introduced into and fixed to a switch case 41 from one side of the latter, although the second body 13 is hidden behind the first body 12 and invisible. These first and second photo-transmissive bodies have their ends disposed in parallel with each other. A step 41a is formed on each inner side surface of the switch case 41. A switching element 45 is adapted to be slid by means of the handle 36 along the step 41a. The switching element 45 carries a U or V-shaped third photo-transmissive body 18 which is fixed to position both its ends opposite to the ends of the first and second photo-transmissive bodies 12,13. A slider 47 is movably received, through a spring (not shown), by a hole (not shown) formed in the lower side of the switching element 45. A shielding member 49 disposed beneath the slider 47 has a lug (projection) 49a received by a recess formed in the inner surface of the bottom wall of the switch case 41. The shielding member 49 is adapted to make a seesaw-like rocking motion around the fulcrum constituted by the recess, while permitting the slider 47 to slide on the surface thereof, in accordance with the operation of the switching element 45. The operation of this fourth embodiment is as follows. In the illustrated state, the ends of the third photo-transmissive body 18 are held opposite to or in contact with the ends of the first and second photo-transmissive bodies 12,13, so that the photo-switch takes the "on" state. As the handle 36 is moved to the left through a hole in cover 48 as viewed in the drawing, the switching element 45 is moved also to the left along the step 41a, so that the ends of the third photo-transmissive body 18 are moved away from the associated ends of the first and second photo-transmissive bodies 12,13, while the shielding portion 49b of the shielding member 49 is brought between those ends to turn the switch into the "off" state.

This embodiment provides an equivalent resolution between "on" and "off" states to that performed by the preceding embodiments. In addition, the construction of the switch as a whole is as simple as that of the third embodiment. As a modification of this fourth embodiment, it is possible to incorporate an additional combination of the first to third photo-transmissive bodies. Namely, it is possible to provide another pair of the first and second photo-transmissive bodies at the left wall of the switch case 41 shown in FIG. 8 and a cooperating third photo-transmissive body 18 on the left side of the switching element 45. It is also possible to use three or more combinations of the first to third photo-transmissive bodies to realize a photo-switch having triple switching function.

Figure 9:
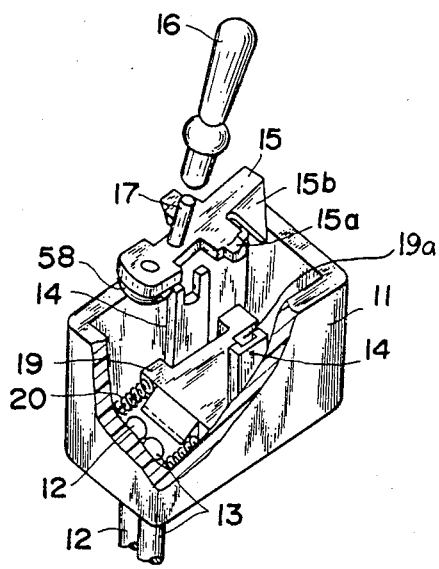
FIG. 9 is a perspective view of an essential part of a fifth embodiment.

FIG. 9 is an exploded perspective view of an essential part of a fifth embodiment of the invention in which a reflecting member 58 is used in place of the photo-transmissive body 18 of the first embodiment. In this case, therefore, the photo-transmissive bodies 12,13 are positioned in close proximity to each other, and the spring 20 is provided at the end of the shielding member 19.

Figure 10:
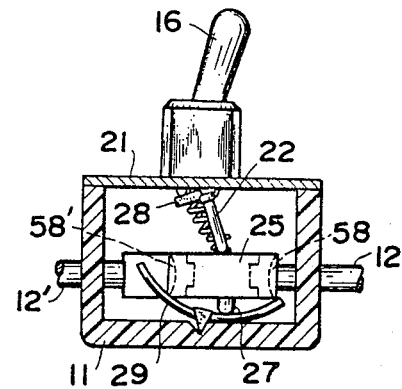
FIGS. 10 and 11 are a sectional view and an exploded perspective view of an essential part of a sixth embodiment.
Figure 11:
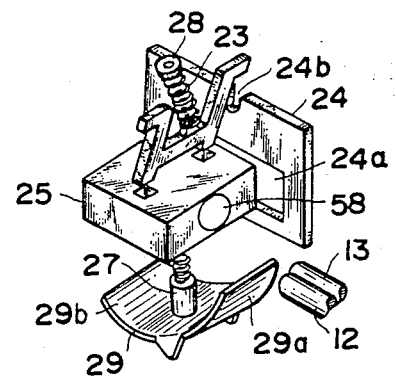

In a sixth embodiment of the invention shown in FIGS. 10 and 11, reflecting members 58,58' are used in place of the photo-transmissive bodies 18,18' of the second embodiment, and the photo-transmissive bodies 12,13 and 12', 13' are positioned close to each other. Other portions are materially identical to those of the second embodiment.

Figure 12:
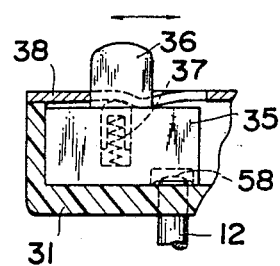
FIG. 12 is a sectional view of a part of a seventh embodiment of the invention.

FIG. 12 shows a seventh embodiment of the invention in which, instead of the photo-transmissive body 18 of the third embodiment, a reflecting member 58 is used. Although not illustrated, the photo-transmissive bodies 12,13 are arranged in close proximity to each other.

Figure 13:
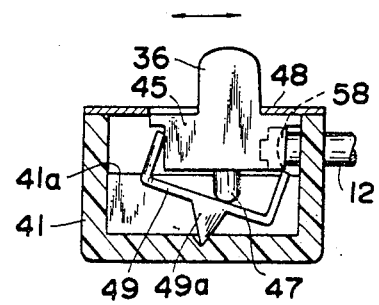
FIG. 13 is a sectional view of an eighth embodiment of the invention.

FIG. 13 shows an eighth embodiment of the invention in which a reflecting member 58 is used in place of the photo-transmissive body 18 of the fourth embodiment, and the photo-transmissive bodies 12,13 are positioned close to each other, although not shown.

Although the invention has been described through specific terms, the described embodiments are not for the limiting purpose but are shown for the illustrative purpose only, and various changes and modifications may be imparted thereto without departing from the spirit of the invention.

For instance, although the third photo-transmissive body 18 is described to have V or U-like form, it can obviously have any desired bending form provided that both ends thereof can be positioned to oppose the corresponding ends of the first and second photo-transmissive bodies.

It is also to be noted that, although the invention has been described in the form of toggle switches and slide switches, it can be equally applied to other types of switches such as wave-type switches, push-button switches and rotary switches.

What is claimed is:

1. A photo-switch comprising: a switch case; a first and a second photo-transmissive body introduced into said switch case and having ends arranged in parallel with each other; a third photo-transmissive body which is bent to have parallel ends opposing said ends of said first and second photo-transmissive bodies; a shielding member adapted to shield the ends of said first and second photo-transmissive bodies from each other; and a switching means operable in accordance with the operation of a handle rockably mounted on said switch case, in such a manner that, when said ends of said third photo-transmissive body are brought to oppose said ends of said first and second photo-transmissive bodies with a small gap therebetween or into contact with the same, said shielding member is moved away from said ends of said first and second photo-transmissive bodies whereas, when said ends of said third photo-transmissive body are moved away from said ends of said first and second photo-transmissive bodies, said shielding member is brought into the space between the ends of the first and second photo-transmissive bodies to optically insulate them from each other, thereby to selectively interrupt the transmission of light between said first and second-photo-transmissive bodies.

2. A photo-switch as claimed in claim 1, wherein said third photo-transmissive body is bent in an U or V-like form.

3. A photo-switch as claimed in claim 2 wherein a reflecting member adapted for reflecting the light coming from either one of said first and second photo-transmissive bodies is used in place of said third photo-transmissive body.

4. A photo-switch as claimed in claim 1, wherein said switching means includes a switching element operatively connected to said handle, said third photo-transmissive body being fixed to said switching element.

5. A photo-switch as claimed in claim 4, wherein said shielding member is adapted to be moved in accordance with the movement of said switching element.

6. A photo-switch as claimed in claim 4, wherein a part of said switching element is used as said shielding member for shielding the light between said first and second photo-transmissive bodies.

7. A photo-switch as claimed in claim 1 wherein said ends of said first to third photo-transmissive bodies have tapered end surfaces.

8. A photo-switch as claimed in claim 1 wherein a plurality of combinations of first to third photo-transmissive bodies are incorporated.

9. A photo-switch as claimed in claim 1 wherein said first and second photo-transmissive bodies are introduced into said switch case from the same side of the latter.

* * * * *